J. HOTZ.
COW BARN GUTTER GRATE.
APPLICATION FILED MAY 19, 1919.
1,366,384.
Patented Jan. 25, 1921.
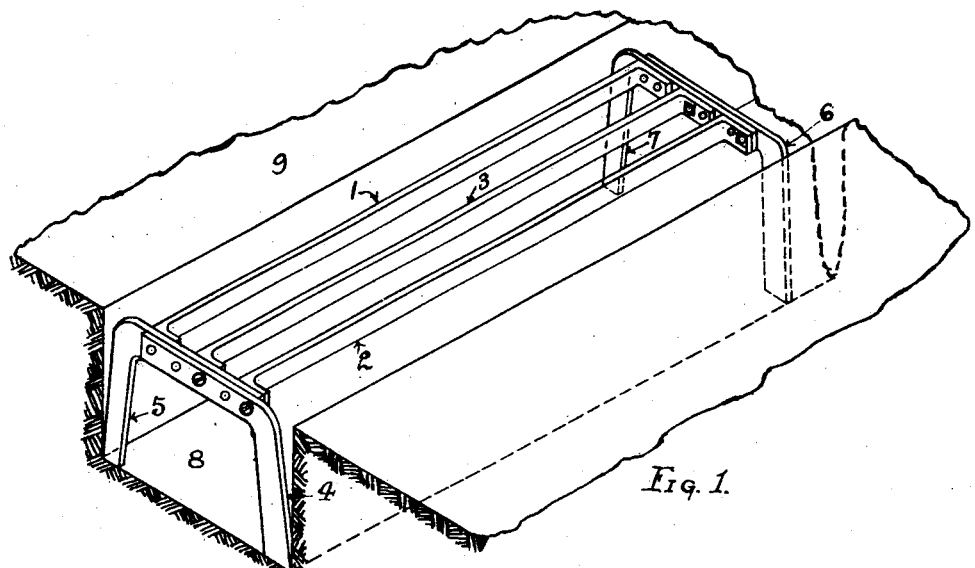
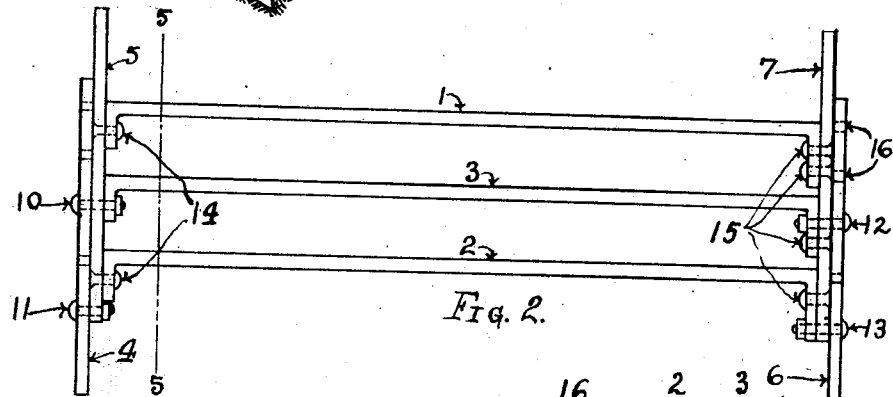
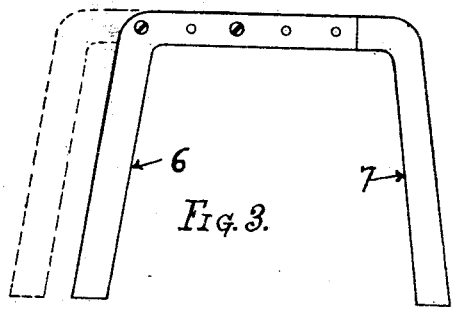
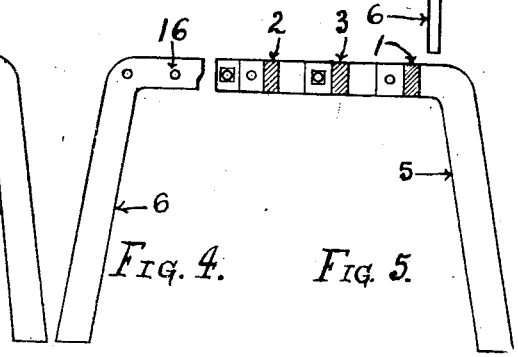
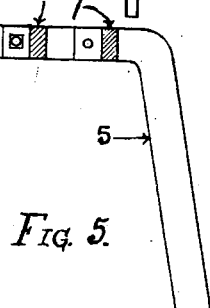
INVENTOR.
Jacob Hotz,
BY Nathan Comstock,
ATTORNEY.

UNITED STATES PATENT OFFICE.

JACOB HOTZ, OF ARCADIA, WISCONSIN.

COW-BARN-GUTTER GRATE.

1,366,384.　　　　　Specification of Letters Patent.　　Patented Jan. 25, 1921.

Application filed May 19, 1919. Serial No. 298,300.

*To all whom it may concern:*

Be it known that I, JACOB HOTZ, a citizen of the United States, residing at Arcadia, in the county of Trempealeau and State of Wisconsin, have invented a new and useful Cow-Barn-Gutter Grate, of which the following is a specification.

The present invention relates to stall floors of the conventional type having a platform upon which the animal may stand or lie, and a gutter for the reception of droppings, litter, and other offal.

In general it is the object of the present invention, to prevent, the soiling, of the animals body, and the platform, and the disadvantages resulting therefrom.

One object of my invention, is to prevent, animals from standing with their hind legs in the gutter, soiling their feet and legs, tracking the droppings, litter and filth upon the platform of the stall, where it will soil the body of the animal in lying down, and may be kicked or thrown about by movement of the animal's feet, as by a "kicking cow" and thus contaminate the milk while milking, and to obviate the necessity of washing or cleaning the cow, at a large expenditure of time and labor, before milking.

Another object of the invention is to break animals of the habit of standing with their hind legs in the gutter.

It is a further object of the invention to provide means in the gutter which will permit the passage of droppings, offal, and litter into the gutter, but will prevent the animal from stepping into or standing therein.

More specifically, it is the object of the present invention to provide a grate or grid for the gutter, which may be adjusted to gutters of different width, readily removed for cleaning out of the gutter, which may be supported from the floor of the gutter, and is so constructed as to adapt itself to an unevenness or irregularity therein.

I attain these and other objects and advantages by the structure illustrated in the accompanying drawing, in which—

Figure 1, is a perspective view showing a portion of a stall floor with the grid or grate in position in the gutter.

Fig. 2, is a top plan view of the grid or grate;

Fig. 3, is an end elevation of the grate, an adjustment thereof being indicated in dotted lines;

Fig. 4, is an elevation of a portion of one of the adjustable legs; and

Fig. 5, is a section of the grate taken on the line 5—5, Fig. 2, looking toward the leg 5, the adjustable leg 4 being removed.

Similar numerals refer to similar parts throughout the several views.

In the preferred form of my invention I provide a grate member which is placed in the gutter 8 back of the animal, as shown the grate is formed of bars 1, 3 and 2 extending longitudinally of the gutter, these bars are relatively narrow and are spaced sufficiently far apart to permit droppings, litter and offal to pass easily between them, but close enough to prevent the animal from stepping through the grate. The ends of the bars, which may be of any appropriate length, are connected to supporting members 5 and 7 respectively by means of rivets 14 and 15 which rigidly connect the bars 1 and 2 and one end of the bar 3 with said members, the other end of the bar 3 being held against the supporting member by means of a bolt 10, as clearly shown in Fig. 2.

The supporting members 5 and 7 are bent downwardly as shown in Figs. 1, 2, 3, 4, and 5, so as to form legs for the grate, and are of sufficient length to bring the upper surface of the grate, which should not extend above the level of the platform, into proper position, according to the depth of the gutter. In securing the bars to the supporting members the bar 1 is so placed relative to the bends in the members, that its distance from the rear edge of the platform 9, when the grate is placed in the gutter, will be approximately that of the distance between the bars 1 and 3, and 3 and 2 respectively.

Additional supporting members 4 and 6 are provided, and they are similarly bent to form legs for the opposite side of the grate. Each of these members is provided with a series of apertures 16, suitably spaced so that they may be secured to the bars and the other supporting members by means of bolts 10, 11, 12, and 13 and adjusted thereon to fit gutters of different widths.

In case the floor of the gutter is uneven or irregular I may remove the bolt 11 and permit the member 4 to pivot on the bolt 10, so that the grate may automatically adapt itself to the unevenness or irregularity and still be rigidly and firmly supported in position.

It will be noted that with the supporting members 4 and 6 extended to the extreme position permitted by their adjustment, a considerable space may be left between the rear wall of the gutter and the grate bar 2, but it is intended that the position of the grate shall always be such that the portion of the gutter covered by it, shall exceed in width the longitudinal movement permitted by the tie or fastening of the animal, so as to effectually prevent stepping down into or standing in the gutter.

The length of the grate is made appropriate to, and is preferably shorter than the width of the stall, as the sides of the stall will ordinarily restrain the animal from moving sufficiently to one side or the other to step down off the ends of the grate.

In use the device is adjusted in width so as to fit the gutter, and is placed therein back of an animal. If there should be any unevenness or irregularity of the gutter floor the bolt 11 is removed to permit the grate to adapt itself thereto. Thus positioned the grate forms a rigid support for the animal should it step backward toward the gutter, but readily permits the passage of droppings, litter and offal therethrough into the gutter; it is light enough to be easily removed for cleaning the gutter; and the narrow grate bars form a somewhat uncomfortable support for the animal, so that it soon moves forward again in proper position upon the platform of the stall. I have found that after the grate has been used for some time the animal becomes broken of the habit or tendency to stand in the gutter, and maintains its proper position upon the platform, making the use of the grate no longer necessary. The grate can then be shifted to a position back of some other animal, and a few grates thus made to serve for quite a number of animals.

While I have shown and described a specific grate structure for accomplishing the desired objects, my invention contemplates broadly the use of means operating in the same manner to produce the result desired, and is to be understood as limited only by the state of the art.

I claim:

1. The combination in a device of the character set forth, of a stall floor having a gutter, and readily removable grate means associated with the gutter for preventing an animal from standing or stepping therein, said grate means being provided with depending portions adjustably and freely engaging the floor and side walls of the gutter for supporting and holding it in position.

2. The combination in a device of the character set forth, of a stall floor having a gutter, a grate for the gutter having depending supports or legs adapted to rest upon the floor of the gutter, and means for adjusting the supports against the side walls of the gutter to hold the grate in position.

3. The combination in a device of the character set forth, of a stall floor having a gutter, means for preventing the animal from standing or stepping in the gutter, supporting means for the preventing means, and means for automatically adjusting the supporting means for irregularities of the supporting surface.

4. The combination in a device of the character set forth, of a stall floor having a gutter, means for preventing an animal from standing or stepping in the gutter, supporting means for the preventing means, means for automatically adjusting the supporting means for irregularities of the supporting surface, and means whereby the supporting means may be adjusted for gutters of different widths.

5. The combination in a device of the character set forth, of a stall floor having a gutter, grate means for the gutter for preventing an animal from standing or stepping therein, supporting means for the grate, means for automatically adjusting the supporting means for irregularities of the supporting surface, and means whereby the supporting means may be adjusted for gutters of different widths.

6. The combination in a device of the character set forth, of a stall floor having a gutter, and a grate for the gutter having narrow bars and wide spaces to render standing thereon uncomfortable for an animal, whereby it will be induced to occupy its proper position.

7. The combination in a device of the character set forth, of a stall floor having a gutter, a grate for the gutter having narrow bars and wide spaces to render standing thereon uncomfortable for an animal and to permit a free passage of litter and offal, supports for the grate formed so that a bar of the grate is positioned at a distance from the front edge of the gutter approximately equal to the distance between the bars of the grate.

8. The combination in a device of the character set forth, of a stall floor having a gutter, a grate for the gutter having narrow bars and wide spaces, supports for the grate so formed that a bar of the grate is positioned at a distance from the front edge of the gutter approximately equal to the distance between the bars of the grate, and means for adjusting the supports against the rear wall of the gutter to hold the grate in position.

9. The combination in a grate of the character set forth, of narrow bar members widely spaced to render standing thereon uncomfortable for an animal and to permit a free passage of litter and offal, and supports for the bar members formed so that one of the bar members will be spaced horizontally from the ends of the supports a distance approximately equal to the distance between the bars.

10. The combination in a grate of the character set forth, of narrow bar members widely spaced to render standing thereon uncomfortable for an animal and to permit a free passage of litter and offal, and supports for the bar members having depending legs.

11. The combination in a grate of the character set forth, of bar members, supports for the bar members, means for automatically adjusting the supports for irregularities of the supporting surface, and means whereby the supports may be adjusted for gutters of different widths.

12. The combination in a grate of the character set forth, of bar members, supporting members having one end bent to form legs and the other rigidly secured to the bar members, additional supporting members similarly bent and formed and provided with a series of apertures, and means for adjustably securing the additional supporting members to the bars and suporting members.

13. The combination in a grate of the character set forth, of bar members, supporting members having one end bent to form legs and the other rigidly secured to the bar members, additional supporting members similarly bent and formed and means for adjustably securing the additional members to the bars and supporting members, said means comprising a pivotal connection between one of the additional supporting members, and the bars and a supporting member.

14. The combination in a grate of the character set forth, of widely spaced bar members, supporting members having one end bent to form legs and the other secured to the bar members, additional supporting members similarly bent and formed one end thereof being provided with a series of apertures, bolts passing through a pair of the apertures of one of the additional supporting members adjustably and rigidly connecting it to the bar and supporting members, and a bolt passing through an aperture of the other additional supporting member adjustably and pivotally connecting it to the bars and supporting member.

15. The combination in a device of the character set forth, of a stall floor having a gutter, of a grate for the gutter having bar members, supporting members for the bar members having one end bent to form legs and the other rigidly secured to the bar members, additional supporting members similarly bent and formed and provided with a series of apertures, and means adjustably securing the additional supporting members to the bars and supporting members.

16. The combination in a grate of the character set forth, of narrow bar members widely spaced, supports for the bar members having depending legs, and means whereby the supports may be adjusted.

17. The combination in a device of the character set forth, of a stall floor having a gutter, and a grate for the gutter having narrow bars and wide spaces to render standing thereon uncomfortable for an animal, whereby it will be induced to occupy its proper position, supports for the bar members having depending legs, and means whereby the supports may be adjusted.

JACOB HOTZ.